United States Patent
Plaunt

(10) Patent No.: US 8,179,476 B2
(45) Date of Patent: May 15, 2012

(54) SYSTEMS AND METHODS FOR SYNCHRONIZING AUDIO AND VIDEO DATA SIGNALS

(75) Inventor: Alan Plaunt, Dundas (CA)

(73) Assignee: Evertz Microsystems Ltd., Burlington, Ontario (*) Notice: Subject to any disclaimer, the term of this patent is extended or adjusted under 35 U.S.C. 154(b) by 1295 days.

(21) Appl. No.: 11/739,082

(22) Filed: Apr. 23, 2007

(65) Prior Publication Data

US 2007/0247550 A1 Oct. 25, 2007

(30) Foreign Application Priority Data

Apr. 21, 2006 (CA) .................................. 2544459

(51) Int. Cl.
*H04N 9/475* (2006.01)
*H04N 7/12* (2006.01)
*G06F 15/16* (2006.01)

(52) U.S. Cl. ............. 348/515; 348/423.1; 709/236
(58) Field of Classification Search .............. None
See application file for complete search history.

(56) References Cited

U.S. PATENT DOCUMENTS

| 5,430,485 A | * | 7/1995 | Lankford et al. | 348/423.1 |
| 5,896,388 A | * | 4/1999 | Earnest | 370/230.1 |
| 6,125,398 A | * | 9/2000 | Mirashrafi et al. | 709/236 |
| 6,181,383 B1 | * | 1/2001 | Fox et al. | 348/515 |
| 6,583,821 B1 | * | 6/2003 | Durand | 348/515 |

* cited by examiner

*Primary Examiner* — Jefferey Harold
*Assistant Examiner* — Sean Haiem
(74) *Attorney, Agent, or Firm* — Bereskin & Parr LLP/S.E.N.C.R.L., s.r.l.

(57) ABSTRACT

Systems and method for synchronizing audio and video signals are described. The audio and video signals are tagged in an encoder. The tagged signals are transmitted across a network. The tagged signals are analyzed to detect phase errors or lip synch errors between them. A synchronization signal is generated in response to such lip synch errors.

25 Claims, 6 Drawing Sheets

SYSTEMS AND METHODS FOR SYNCHRONIZING AUDIO AND VIDEO DATA SIGNALS

FIELD

This invention relates to communication systems. More particularly, the invention relates to system and methods for synchronizing audio and video data signals.

BACKGROUND

In many entertainment and other communication systems, it is desirable to synchronize audio and video data signals. Typically, such signals are initially generated or provided in a pair (or more) of time synchronized signals. The audio and video signals may then be processed and transmitted in different communication processing equipment and transmission links. As a result of different in the different communication paths, the signals may become out of synch with one another. This is often referred to as a lip synch error. It is desirable to provide a system that compensates for lip synch errors and allows audio and video signals to be re-synchronized.

SUMMARY

A first aspect of the invention provides a method of synchronization an audio signal and a video signal comprising: providing an input audio signal and an input video signal that have a synchronized phase relationship; tagging the input video signal to provide a tagged video signal; tagging the input audio signal to provide a tagged audio signal; transmitting the tagged video and audio signals through a network; analyzing the tagged audio and video signals to determine the extent to which the tagged audio and video signals are unsynchronized; and providing a synchronization signal corresponding to corresponding the extent to which the tagged audio and video signals are unsynchronized.

In some embodiments, the video signal is tagged by: generating a correlation signal at a correlation signal bit frequency; generating a video correlation waveform gain signal corresponding to the power level of the input video signal within a selected frequency range; providing a video correlation signal based on the correlation signal and the video correlation waveform gain signal; and adding the video correlation signal to the input video signal.

In some embodiments, the correlation signal corresponds to a pre-determined tagging sequence.

In some embodiments, the tagging sequence is a bit sequence and the bit length of the bit sequence is selected based on the maximum synchronization error to be corrected.

In some embodiments, the correlation signal is generated with a correlation signal bit frequency that is within the pass band of the network.

In some embodiments, the correlation signal bit frequency is determined based at least in part on a video signal clock that is derived from the input video signal.

In some embodiments, the correlation signal bit frequency is determined based at least in part on the input audio signal.

In some embodiments, the correlation signal bit frequency is determined based on a clock signal not provided in the input audio signals or the input video signal.

In some embodiments, the correlation signal is well-behaved.

In some embodiments, the correlation signal is chosen to have a relatively high auto-correlation co-efficient when cross-correlated with an unshifted version of itself and to have relative low cross-correlation coefficients when cross-correlated with shifted versions of itself.

In some embodiments, the video correlation signal is provided by smoothing the correlation signal to provide a video correlation waveform; and scaling the video correlation waveform in response to the video correlation waveform gain signal.

In some embodiments, the video correlation waveform signal corresponds to the power level of the input video signal within the pass band of video processing and transmission elements in the network.

In some embodiments, the audio signal is tagged by:
generating an audio correlation waveform gain signal corresponding to the power level of the input audio signal within a selected frequency range;
providing an audio correlation signal based on the correlation signal and the audio correlation waveform gain signal; and
adding the audio correlation signal to the input video signal.

In some embodiments, the video correlation signal is provided by smoothing the correlation signal to provide an audio correlation waveform; and scaling the audio correlation waveform in response to the audio correlation waveform gain signal.

In some embodiments, the video correlation waveform signal corresponds to the power level of the input audio signal within the pass band of audio processing and transmission elements in the network.

In some embodiments, the audio signal is tagged by: generating a correlation signal at a correlation signal bit frequency; generating an audio correlation waveform gain signal corresponding to the power level of the input audio signal within a selected frequency range; providing an audio correlation signal based on the correlation signal and the audio correlation waveform gain signal; and adding the audio correlation signal to the input video signal.

In some embodiments, the video correlation signal is provided by: smoothing the correlation signal to provide an audio correlation waveform; and scaling the audio correlation waveform in response to the audio correlation waveform gain signal.

In some embodiments, the video correlation waveform signal corresponds to the power level of the input audio signal within the pass band of audio processing and transmission elements in the network.

In some embodiments, the audio and video signals are analyzed by: generating a weighted tagged video signal corresponding to the tagged video signal; sequentially comparing the weighted tagged video signal with a progressively shifted version of the correlation signal; identifying a video offset value corresponding to a phase difference between the tagged video signal and a zero phase signal; generating a weighted tagged audio signal corresponding to the tagged audio signal; sequentially comparing the weighted audio video signal with a progressively shifted version of the correlation signal; and identifying an audio offset value corresponding to a phase difference between the tagged video signal and the zero phase signal.

In some embodiments, the video offset value is identified in part by performing a leaky integration of a series of derivative value for the result of the comparison between the weighted tagged video signal and each progressively shifted version of the correlation signal between successive zero phase signals.

In some embodiments, the audio offset value is identified in part by performing a leaky integration of a series of derivative value for the result of the comparison between the weighted tagged audio signal and each progressively shifted version of the correlation signal between successive zero phase signals.

In some embodiments, the synchronization signal is provided based on the difference between the video offset value and audio offset value.

In some embodiments, the weighted tagged video signal is generated by filtering the tagged video signal across frequency components generally corresponding to frequency components of the correlation signal.

In some embodiments, the weighted tagged audio signal is generated by filtering the tagged audio signal across frequency components generally corresponding to frequency components of the correlation signal.

In some embodiments, the correlation sequence is selected based on a transformation of the tagged video signal between tagging of the video signal and the analysis of tagged video signal.

BRIEF DESCRIPTION OF THE DRAWINGS

The present invention will now be explained by way of example, with reference to the drawings, in which.

DETAILED DESCRIPTION OF EXEMPLARY EMBODIMENTS

Figure 1:
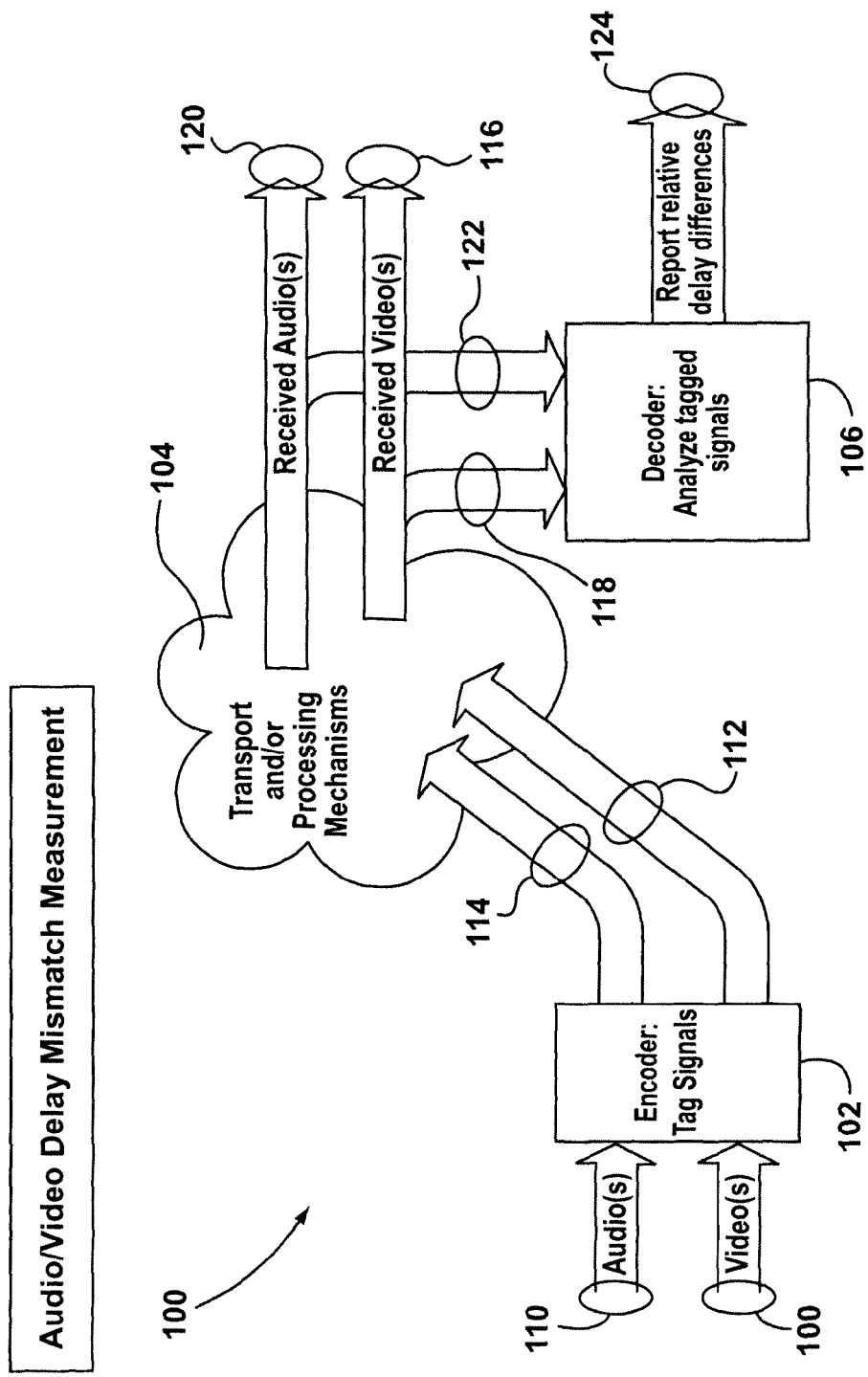
FIG. 1 illustrates an first example data signal synchronization system.

Reference is first made to FIG. 1, which illustrates a data signal synchronization system 100.

System 100 includes an encoder 102, a signal transport and processing network 104 and a decoder 106. Encoder 104 receives an input video signal at a video input terminal 108 and an input audio signal at an audio input terminal 110. The input audio signal and the input video signal are in a certain phase relationship. Typically, the input audio signal and the input video signal are synchronized such that the audible contents of the input signal are synchronized with the visual contents of the input video signal when the two signals are simultaneously reproduced. For example, the input audio signal and input video signal may be produced by an audio/video source such as a video tape player, DVD player or set-top television decoder. The input audio signal and input video produced by the audio/video source are synchronized in time at the output terminals of the device, which are coupled to the audio input terminal 110 and the video input terminal 108.

Encoder 102 tags the video signal to produce a tagged video signal at an encoder video output terminal 112. Encoder 102 tags the audio signal to produce a tagged audio signal at an encoder audio output terminal 114. Encoder 102 produces the tagged video signal by adding a correlation signal to the video signal. Encoder 102 produces the tagged audio signal by adding the same correlation signal to the audio signal.

The tagged video signal is transported through network 104 to a video output terminal 116 and a decoder video input terminal 118. The tagged audio signal is transported though network 104 to an audio output terminal 120 and a decoder audio input terminal 122.

Network 104 will typically include various audio and video signal processing devices and typically, the tagged audio signal and the tagged video signal will travel different paths through network 104. For example, the tagged video signal may travel through a composite decoder, an MPEG compressor, a transport stream multiplex, a digital transport link, a transport stream de-multiplex, MPEG de-compressor and a composite encoder between the encoder video output terminal 112 and the decoder video input terminal 118. This video transmission path will introduce a video delay in the tagged video signal. The tagged audio signal may travel through an audio dynamic range processor, an audio compressor, a transport stream multiplex, a digital transport link, a transport stream de-multiplex and an audio de-composer. This audio transmission path will introduce an audio delay in the tagged audio signal. The video delay and audio delay will typically be different with the result that the tagged video signal and the tagged audio signal will be out of synchronization when the they respectively reach the video output terminal 116 and the audio output terminal 120 as compared to the relative phases of the input audio signal and the input video signal at the audio input terminal and the video input terminal.

The audio output terminal is coupled to an audio reproduction device. The video output terminal is coupled to a video reproduction device. The two reproduction devices reproduce the audio and video content of the tagged audio signal and the tagged video signal. As a result of the difference in the video delay and the time delay, the audio and video reproductions may have become unsynchronized.

Decoder 106 analyzes the tagged audio stream and the tagged video stream to determine the extent to which the two streams have become unsynchronized and provides a corresponding synchronization signal at a synchronization signal terminal 124.

Figure 2:
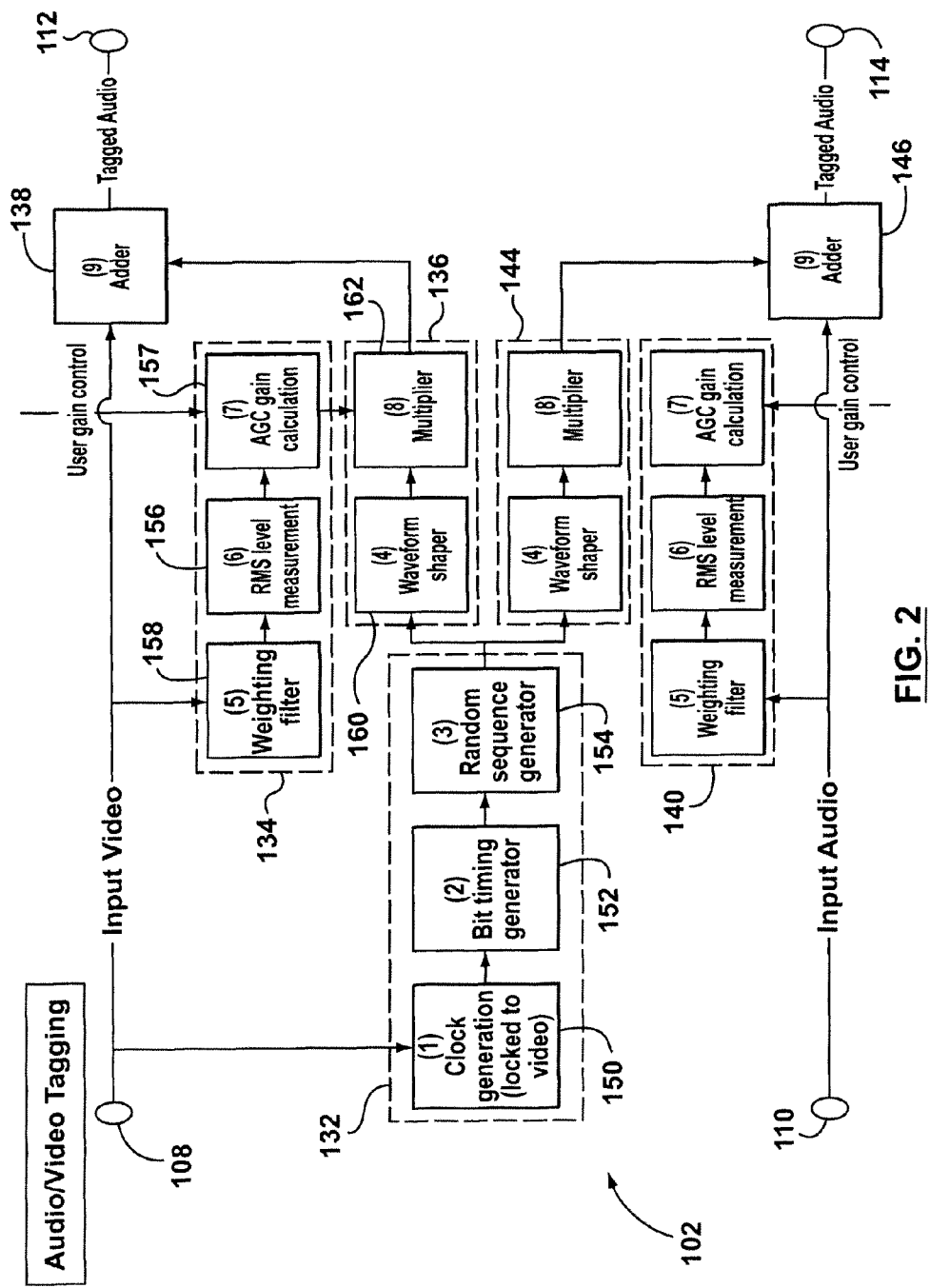
FIG. 2 illustrates an encoder of the data signal synchronization system of FIG. 1.
Figure 3:
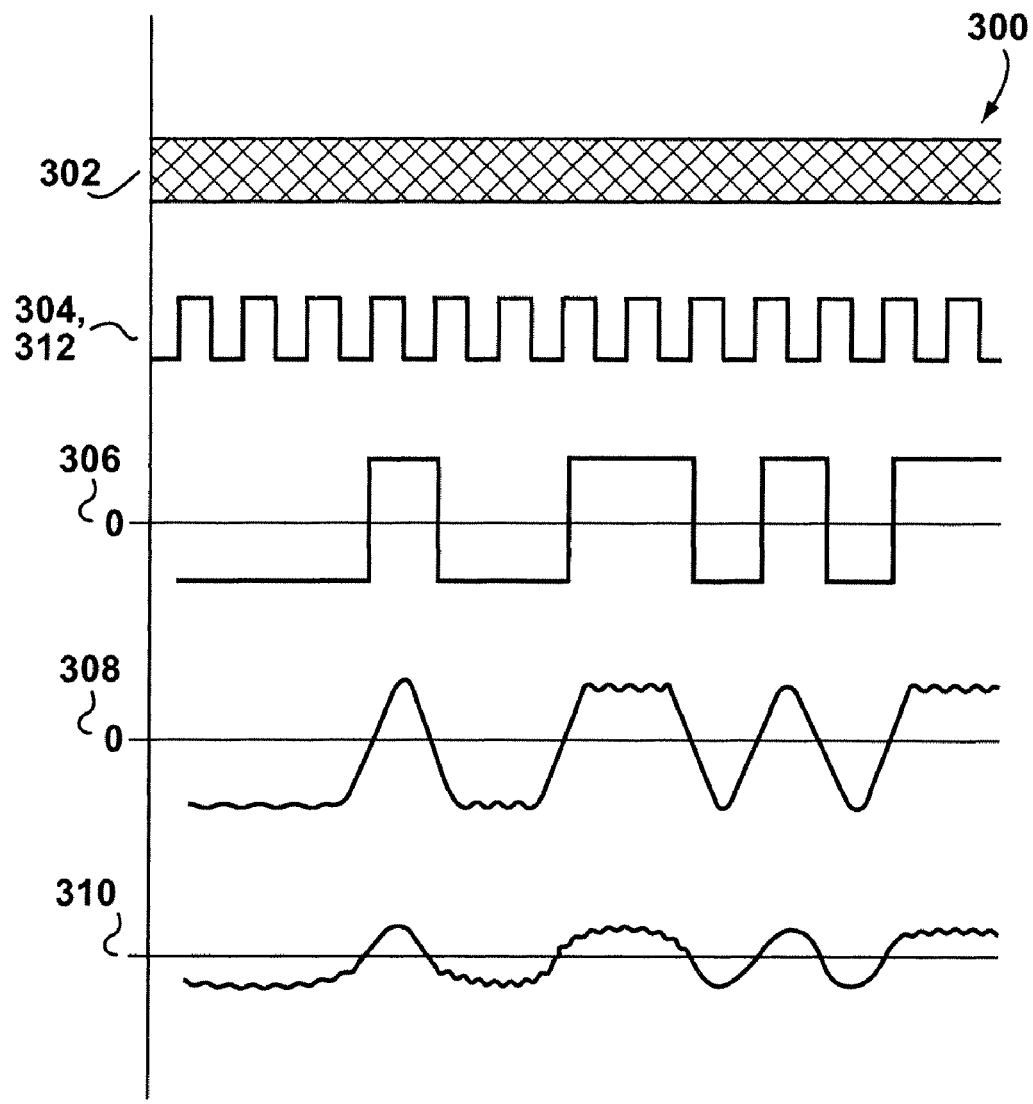
FIG. 3 is a timing chart illustrating various signals in the data signal synchronization system of FIG. 1.

Reference is next made to FIG. 2 and FIG. 3. FIG. 2 illustrates the encoder 102. FIG. 3 is a timing chart 300 illustrating various signals in the system 100.

Encoder 102 includes a correlation signal block 132, a video signal analysis block 134, a video correlation waveform generation block 136, a video correlation signal adder 138, an audio signal analysis block 140, an audio correlation waveform generation block 144 and an audio correlation signal adder 146.

Correlation sequence signal block 132 includes a clock generator 150, a sequence timing generator 152 and a correlation signal generator 154.

Clock generator 150 generates a clock signal 302. In system 100, clock generator 150 is coupled to the video input terminal 108 and receives the input video signal. Clock generator 150 generates clock signal 302 by locking onto a video signal clock that is embedded in or derived from the input video signal. For example, many DVD players produce a video signal with a frequency locked 27 MHz clock. Other video signals may have other clock frequencies. The clock generator 150 may lock onto this embedded clock using a phase-locked loop or other clock generation circuit to provide the clock signal 302.

Sequence timing generator 152 divides the clock signal 302 to provide a correlation signal clock 304. The frequency of the correlation signal clock 304 is selected to be within the pass band of network 104 (FIG. 1).

For example, if the input video signal has an embedded video clock at 27 MHz, then clock generator 150 may generate the clock signal 302 at a frequency of 27 MHz. The sequence timing generator 152 may divide this clock frequency by $2^{16}$ to provide a correlation signal clock 304 with a correlation signal bit frequency of about 412 Hz.

The correlation signal clock frequency defines the resolution to which system 100 can synchronize the reproduction of an input audio signal and an input video signal. An average television viewer is typically able to notice an audio/video lip synch error when an audio signal is more than 15 ms ahead of a video signal or is more than 60 ms behind a video signal. Accordingly, it may be sufficient to synchronize the reproduction of an audio signal and corresponding video signal to be within these tolerances. A signal with a frequency of 412 Hz has a period of about 2.47 ms. If a lip synch error is no greater than 2.47 ms, the vast majority of television viewers will be unable to detect the error.

System 100 may be compatible with a variety of different types of video signals. Other video signals have different clock frequencies. For example, a DVI video signal operating in an HDTV display mode (1920×1080 pixels at a 60 Hz refresh rate) may have an embedded video signal clock with a frequency of 131 MHz. The sequence timing generator 152 may divide this clock frequency by $2^{18}$ to provide a correlation signal clock 304 with a frequency of about 500 Hz, which provides a synchronization resolution of 2 ms.

System 100 may be compatible with a variety of different types of audio and video signals. The clock generator 150 detects the type of video signal received at the video input terminal 108 and locks onto a clock signal in or derived from the video signal to produce the clock signal. The sequence timing generator 152 divides this frequency to produce a correlation signal clock 304 with a correlation signal bit frequency within a desired range. In the present example, the desired range for the correlation signal clock frequency is 400 Hz to 800 Hz, which provides a synchronization resolution of 1.25 ms to 2.5 ms. In any particular implementation and for any particular type of video signal, the correlation signal clock frequency will typically remain essentially fixed once it is chosen to allow the same correlation clock frequency to be chosen at the decoder 106. In a system in which only a single video standard is used, the correlation signal clock frequency will typically remain the same.

In other embodiments, the correlation signal clock may be derived from the input audio signal.

Other systems according to the invention may generate a clock signal independently of the input video signal or input audio signal. For example, the clock generator may receive a timing signal from a satellite such as global positioning system (GPS) satellite and generate the clock signal from this timing signal. Alternatively, the clock generator may include an oscillator from which it can generate the clock signal using the oscillator.

Correlation signal generator 154 generates a correlation signal 306 at the correlation signal clock frequency. The correlation signal corresponds to a pre-determined tagging sequence. The bit length of the tagging sequence is selected based on the desired range of synchronization errors that may occur or which are desired to be corrected. For example, if the maximum synchronization error in a particular system is ±1.25 seconds (for a total correction time period of 2.5 seconds), and if the correlation signal clock frequency is 412 Hz, then the tagging sequence will be at least 1012 bits long. This will allow the system 100 to detect and synchronize a lip synch error in which the audio signal is reproduced up to 1.25 seconds ahead of or behind the corresponding video signal.

Figure 4:
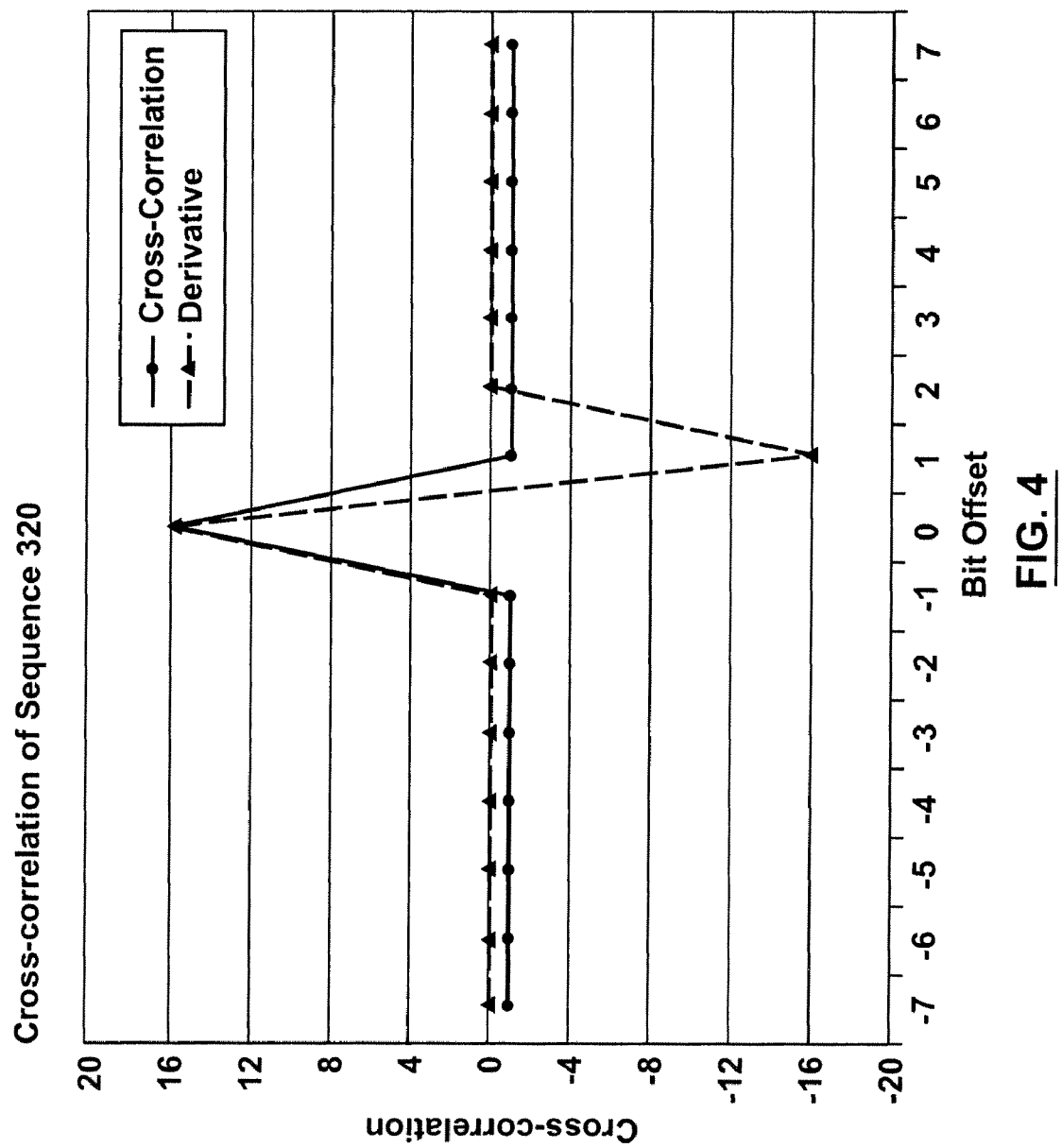
FIG. 4 is a graph illustrating cross-correlation coefficients for a first example correlation sequence.

The bit pattern of the correlation signal is chosen such that the auto-correlation of the in-phase coefficient is relatively high but the out of phase coefficients are relatively low. FIG. 4 illustrates cross-correlation coefficients for the following sequence 320:

−1 −1 −1 1 −1 −1 1 1 −1 1 −1 1 1 1 1.

This correlation sequence consists of fifteen bits. The auto-correlation or cross correlation or cross product of the correlation coefficient of the signal with another version of itself is calculated by multiplying corresponding bits of the correlation signal and summing the resulting products. For example, if sequence 320 is cross correlated with a version of itself shifted by 3 bits, the following calculation is done:

| | Bit | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Signal 320 | −1 | −1 | −1 | 1 | −1 | −1 | 1 | 1 | −1 | 1 | −1 | 1 | 1 | 1 | 1 |
| Signal 320 shifted 3 bits | 1 | 1 | 1 | −1 | −1 | −1 | 1 | −1 | −1 | 1 | 1 | −1 | 1 | −1 | 1 |
| Bit Product | −1 | −1 | −1 | −1 | 1 | 1 | 1 | −1 | 1 | 1 | −1 | −1 | 1 | −1 | 1 |
| Sum of Bit Products | | | | | | | | −1 | | | | | | | |

The cross-correlation of the signal 320 cross-correlated with a version of itself shifted two bits is −1. FIG. 4 illustrates that the auto-correlation or cross-correlation co-efficient of the sequence 320 cross-correlated with itself is 15. The cross-correlation co-efficient of the sequence 320 cross-correlated with any shifted version of itself is −1. The derivative of the cross-correlation in relation to a progressive bit offset is zero at all offsets except near the offset of zero. The derivative exaggerates the peak in the cross-correlation plot.

Figure 5:
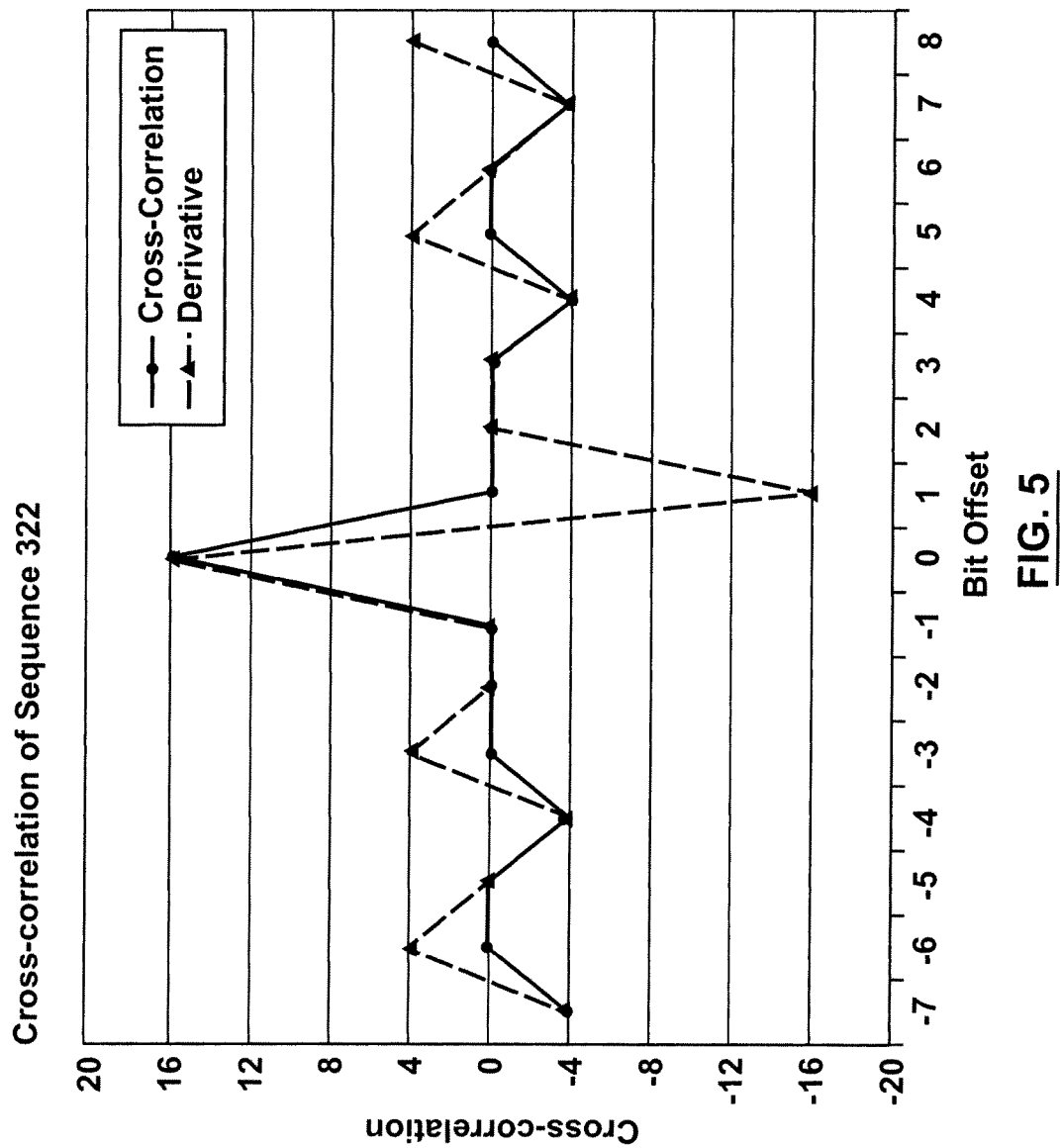
FIG. 5 is a graph illustrating cross-correlation coefficients for a second example correlation sequence.

FIG. 5 illustrates cross-correlation coefficients of another sequence 322:

−1 −1 −1 1 −1 −1 1 1 −1 1 −1 1 1 1 1.

FIG. 5 illustrates that the cross-correlation co-efficient of the sequence 322 cross-correlated with itself is 16. The cross-correlation co-efficient of the sequence 322 cross-correlated with shifted versions of itself varies between −1 and −4. The derivative of the cross-correlation illustrates that the cross-correlation is not consistent when the bit offset is non-zero.

Sequence 320 is said to be "well-behaved" in that its cross-correlation co-efficient is relatively constant (or in this case, precisely constant) except when the signal is cross-correlated with itself. In contrast, sequence 322 is not well-behaved in that its cross-correlation varies when the signal is cross-correlated with shifted versions of itself.

Sequences 320 and 322 are relatively short and are used here as examples of sequences that are well-behaved and not well-behaved. Longer sequences (for example, a 1012 bit sequence) will typically not have a constant cross correlation co-efficient when the sequence is cross-correlated with a shifted version of itself. A well-behaved long sequence suitable for use as a correlation sequence will be well-behaved in that the sequence will exhibit a relatively consistent cross-correlation co-efficient when the sequence is cross-correlated with a shifted version of itself and a substantially different cross-correlation co-efficient when the sequence is cross-correlated with itself. One measure of a well-behaved sequence is that a plot of the cross-correlation co-efficient exhibits a large derivative at an offset equal to the length of the sequence (and at an offset of 0) and exhibits a small derivative at other offsets, as is illustrated in FIG. 4. Sequences that are well-behaved serve more efficiently as correlation sequences in the present system.

The correlation sequence 306 is generated as a digital sequence by the correlation signal generator with hard transitions between high and low levels. The high and low levels will typically have opposite signs and approximately equal magnitude. One bit in the correlation sequence is generated per cycle of the correlation signal clock and the sequence is continuously repeated.

The correlation waveform generated by the video correlation signal generator 154 may have a limited frequency bandwidth. For example, the correlation sequences described have a frequency of 400 Hz to 500 Hz. In other systems, correlation sequences with higher or lower frequencies may be used depending on the pass band of the network 104, the acceptable synchronization error. In some embodiments, the correlation sequence frequency may be as low as 50 Hz or even lower. In other embodiments, the correlation sequence frequency may be as high as 1 kHz or even higher. The correlation signal generator 154 generates a smoothed waveform at this correlation sequence frequency and the smoothed waveform may have frequency components that are all less 20 kHz, for example.

Video signal analysis block 134 includes a signal weighting filter 155, a signal level meter 156 and gain controller 157.

The weighting filter 155 has a pass band corresponding to the frequency components of the video correlation signal 308, which is described in greater detail below. In the example of a correlation signal with frequency components ranging between 400 Hz to 20 kHz, the weighting filter may be a low pass filter with a cutoff frequency of 25 kHz.

A video correlation signal may have any frequency components that are within the pass band of network 104 and more specifically within the pass band of video signal processing and transmission components in network 104 through with the video signal will be transmitted. In an example of a correlation signal with frequency components between 1.5 GHz and 1.8 GHz, the weighting filter may be a band pass filter with cutoff frequencies of 1.4 GHz and 1.9 GHz.

The weighted video signal is analyzed by signal level meter 156, which produces a video power level signal corresponding to the power level of the weighted video signal in the pass band of the video correlation signal 308. The gain controller 157 generates a video correlation waveform gain signal. Gain controller 157 may optionally also receive an external user video gain control signal from a user video gain control terminal 159*v*. The gain controller 157 creates the video correlation waveform gain signal to be greater when the weighted video signal has a higher power level and to be smaller when the weighted video signal has a smaller power level. If the user gain control signal is provided, the magnitude of the video correlation waveform gain signal is scaled in response to the user gain control signal.

The video correlation waveform generation block 136 includes a video waveform shaper 160 and a multiplier 162. The video waveform shaper 160 receives the correlation sequence 306 and provides a corresponding shaped video correlation waveform 308. In this example, video correlation waveform 308 is a smoothed version of the digital correlation sequence 306 and essentially has the high frequency components of the correlation sequence filtered out.

The video correlation waveform 308 is scaled by multiplier 162 to produce a video correlation signal 310 in response to the video correlation waveform gain signal.

The video correlation signal 310 is added to input video signal by adder 138 to produce a tagged video signal at encoder video output terminal 112.

In the present example, video correlation waveform 308 is a smoothed version of correlation signal 306. This results in fewer high frequency components being added to the input video signal by adder 138 when the video correlation signal 310 is added to the input video signal. The power level of the video correlation signal 310 is adjusted by multiplier 162 such that the video correlation signal has sufficient power to be detected in decoder 106. The power level of the video correlation signal 310 is kept small enough that it does not substantially modify the video information in the tagged video signal.

The audio signal analysis block 140 operates in a manner analogous to video signal analysis block 134 to provide an audio correlation waveform gain signal corresponding to the power level of the input audio signal and, optionally, in response to an optional user audio gain control signal provided at user audio gain control terminal 159*a*. The audio correlation waveform generation block 144 operates in a manner analogous to video correlation waveform generation block 134 to produce a scaled audio correlation signal that has a power level corresponding to the power level of the input audio signal in response to the audio correlation waveform gain signal. The audio correlation signal is added to the input audio signal to provide a tagged audio signal at encoder audio output terminal 114. The power level of the audio correlation signal is sufficiently large to allow it to be detected in detector 106. The power level is sufficiently small that the addition of the audio correlation signal does not substantially alter the audio content of the tagged audio signal relative to the input audio signal.

Figure 6:
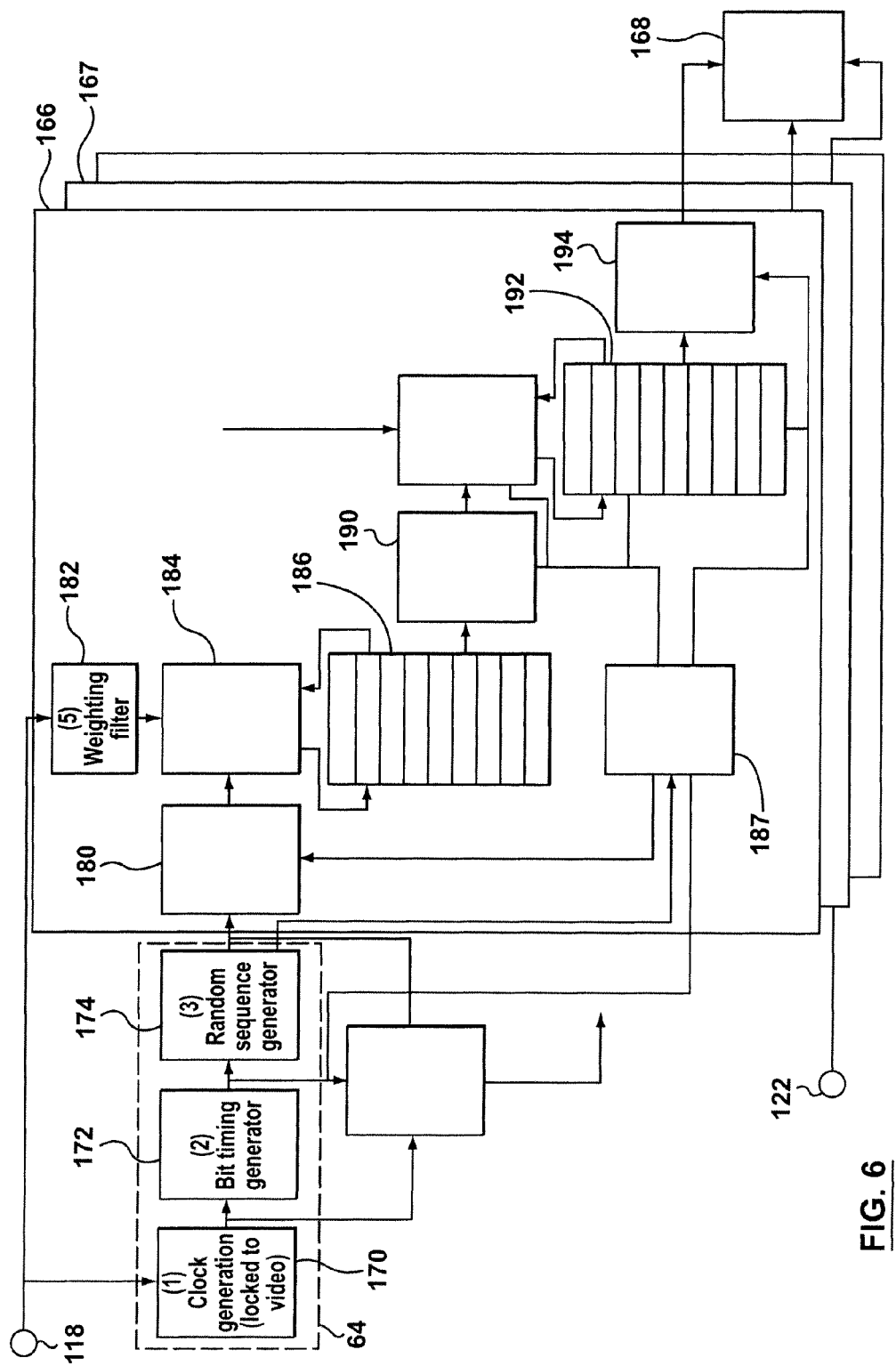
FIG. 6 illustrates a decode or the data signal synchronization system of FIG. 1.

Reference is next made to FIG. 6, which illustrates a portion of the decoder 106. Decoder 106 includes a correlation signal block 164, and a video phase detection block 166, an audio phase detection block 167 and a phase comparison block 168.

Correlation signal block 164 includes a clock generator 170, sequence timing generator 172 and a correlation signal generator 174. Correlation signal block 164 operates in same manner as correlation signal block 132 (FIG. 2) of the encoder 102 to produce a correlation sequence 310. Clock generator 170 operates in the same manner as clock generator 150. As noted above, the clock signal generated by clock generator 150 may be produced in various ways. By configuring the two clock generators 150, 170 to operate in the same fashion, the clock signals produced by the two clock generators have the same frequency.

Sequence timing generator 172 operates in a manner analogous to sequence timing generator 152 and produces a correlation signal clock 312 at the same frequency as correlation signal clock 304.

During each cycle of correlation signal clock 312, the correlation signal generator 174 outputs the entire correlation signal 306 at its output terminal. On each cycle, the correlation signal is shifted by one bit. For example, the example correlation sequence 320 (FIG. 4) will be output in the following bit patterns during three sequential cycles of the correlation signal clock 312:

| | Bit output order | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Cycle 1 (zero bit shift) | −1 | −1 | −1 | 1 | −1 | −1 | 1 | 1 | −1 | 1 | −1 | 1 | 1 | 1 | 1 |
| Cycle 1 (one bit shift) | 1 | −1 | −1 | −1 | 1 | −1 | −1 | 1 | 1 | −1 | 1 | −1 | 1 | 1 | 1 |
| Cycle 1 (two bit shift) | 1 | 1 | −1 | −1 | −1 | 1 | −1 | −1 | 1 | 1 | −1 | 1 | −1 | 1 | 1 |

Over a number of cycles equal to the correlation sequence's length in bits, the correlation sequence is shifted through completely.

Video phase detection block 166 includes a fast correlation signal generator 180, a weighting filter 182, a cross-correlation calculation block 184, a correlation data memory 186, correlation calculation controller 187, a derivative calculation block 190, a integrated correlation data memory 192 and video phase block 194.

During each cycle of the correlation signal clock 312, the progressively shifted version of the correlation sequence generated by the correlation sequence generator is loaded into the fast correlation signal generator 180, which has a number of correlation sequence bit memory registers equal to the length of the correlation sequence.

Weighting filter 182 receives the tagged video signal from the detector video input terminal 118 and produces a weighted tagged video signal. Weighting filter 182 operates in a manner analogous to weighting filter 155 and produces the weighted tagged video signal with frequency components generally corresponding to the frequency components of the correlation signal 308.

Correlation data memory 186 has a number of correlation co-efficient memory registers equal to the number of bits in the correlation sequence. There is a sequential one-to-one relationship between the correlation signal bit memory registers and the correlation co-efficient memory registers.

The correlation calculation controller 187 is coupled to the correlation sequence generator 174 to receive a "zero phase" signal, which is transmitted each time the correlation sequence generator is generating the correlation sequence to the fast correlation signal generator 180 in its unshifted form (which will happen after a number of cycles of the correlation signal clock 312 equal to the bit length of the correlation sequence). When the correlation calculation controller 187 receives the zero phase signal, it generates a memory clear signal causing each of the correlation co-efficient registers to be set to zero.

The correlation calculation controller 187 is coupled to the sequence timing generator to receive the correlation signal clock 312. During each cycle of the correlation signal clock 312, the correlation calculation controller 187 generates control signals causing the fast correlation signal generator 180 to load the shifted version of the correlation sequence into the fast correlation signal generator's memory register. The correlation calculation controller 187 also generates a sample control signal that causes the cross-correlation calculation block 184 to sample the magnitude of the weighted tagged video signal and store the sampled signal power level.

The correlation calculation controller 187 then generates a control signal with a number of pulses equal to the bit length of the correlation sequence. During each pulse, the derivative calculation block 190 sequentially multiplies the bit value stored in each correlation co-efficient bit by the sampled signal power level and adds the result to the value recorded in each corresponding correlation co-efficient register.

Between pulses of the zero phase signal, a complete set of correlation coefficients for the correlation sequence compared to the samples of the weighted signal are calculated and recorded in the correlation co-efficient register. The correlation co-efficient stored in the corresponding correlation co-efficient register of correlation data memory 186 corresponds to a shifted version of the correlation sequence. Since the correlation co-efficient registers are zeroed before the correlation is generated in its unshifted order, the correlation coefficients for every version of the correlation sequence are recorded, starting with the unshifted version and then through each progressively shifted version.

The integrated correlation data memory 192 has a number of integrated co-efficient registers equal to the number of bits in correlation sequence. There is a one-to-one relationship between correlation co-efficient registers and the integrated co-efficient registers.

Before each memory clear signal, the correlation calculation controller 187 generates a derivative control signal, which causes the derivative calculation block 190 to calculate a derivative value for each correlation co-efficient. The derivative value for each correlation co-efficient is summed with a fraction of the value recorded in the corresponding integrated co-efficient register and the result of the sum is recorded in the integrated co-efficient register. For example, the derivative may be summed with 95% of the value in the integrated co-efficient register. The resulting value is weighted towards the newly calculated derivative value. Over time, the value in each co-efficient register represents an integrated value of a series of derivatives for each bit in the correlation sequence (or each shifted version of the correlation sequence), with a weighting towards the most recent values. If a larger fraction of the old integrated co-efficient is used, then the weighting towards more recent value is smaller. For example, a ratio such 99.5% gives a larger weighting to older derivative values. A weighting such as 80% give a larger weighting to newer derivative values. This operation may be referred to as a leaky integration.

The derivative values for each shifted version of the correlation signal are calculated and "leakily" integrated once during each complete rotation of the correlation sequence (i.e. between zero phase signals). After each such derivative calculation and integration, the video phase block examines the resulting integrated coefficients to determine if any integrated co-efficient can be considered a peak. Each integrated co-efficient is considered with at least some of the integrated co-efficients adjacent to the integrated co-efficient, and possibly to all of the other integrated coefficients, then the integrated co-efficient may be considered peak value. Various rules may be used to determine that an integrated co-efficient is a peak. For example, one rule may be that the value of integrated co-efficient is at least twice the magnitude of the average of the other integrated coefficients. Other rules may include aspects of the average of any number of integrated coefficients, the standard deviation of some or all of the integrated co-efficients and other statistical tests. If the configured test is met, the bit offset corresponding to the peak integrated co-efficient is provided to the phase comparison block 168 as a video offset value.

The phase detection block may optionally be configured to determine that a previously detected peak no longer exists if the configured test is no longer met. Alternatively, some hysteresis may be used to determine that a peak no longer exists. For example, if a peak is determined to exist only when an integrated co-efficient is at least twice the average of all other integrated coefficients. However, the peak may be determined to exist unless the peak falls to less than 120% of the average of all other integrated coefficients.

The audio phase detection block 167 has the same structure as the video phase detection block 166. If an audio offset value can be detected, it is also provided to the phase comparison block 168.

The phase comparison block 168 compares the video and audio offsets to determine if the tagged audio signal and tagged video signals have become out of synchronization (or out of phase) with one another. A difference in the video and audio offset values corresponds to the time period by which the signals are out of synchronization. The synchronization error may be estimated by multiplying the phase error (in the number of bit periods) by the length of the each bit period in the correlation signal—which is the bit period of the clock signal 304, 312 (FIG. 3). The phase comparison block 168 generates a video delay signal and an audio delay signal. The delay signal for one of the tagged video signal or the tagged audio signal corresponds to the time period. The other delay signal has a value of zero. The video delay signal is coupled to a video signal delay element (not shown) that is capable of delaying the transmission of the video signal in response to the video delay signal and which is coupled between the video output terminal 116 and a video reproduction device. Similarly, the audio delay signal is coupled to an audio delay element (not shown) that is capable of delaying the transmission of the audio delay signal in response to the audio delay signal and which is coupled between the audio output terminal 120 and an audio reproduction device.

By appropriately delaying an audio or video signal that has become ahead of the other signal, the two signals are at least approximately delay equalized.

The present invention is not limited to use with audio and video signals and could be used with any signals that should be synchronized and to which a correlation signal can be added without destroying the data in the signal.

The present invention may be used in a nested fashion in which a first correlation sequence is used between a first encoder and a first decoder, while a second correlation sequence (which is distinguishable from the first correlation signal) is used between a second encoder and a second decoder. The invention may also be used in an overlapping fashion in which a second encoder adds a second correlation sequence between a first encoder a first decoder. The second decoder follows the first decoder in the signal path.

In system 100, the same correlation sequence used to generate both the audio and video correlation signals. In another embodiment, different sequences, possibly with different frequency components may be used to reduce any signal degradation caused by the correlation signals in the audio and video signals. The correlation signals will be selected to have the same bit length.

In system 100, the video correlation signal 310 is simply added to the input video signal to form the tagged video signal. In another embodiment, the correlation signal 306 may be encoded in the input video signal in another manner. For example, zero crossings of the input video signal (or in a portion of the input video signal) may be modified to reflect the high and low bit values in the correlation sequence to produce the tagged video signal. In the decoder, the modified zero crossings may be extracted to be compared with the correlation signal to determine the phase offset of the tagged video signal as it is received at the decoder. In another embodiment, a "0" bit in the correlation signal is encoded by applying a positive DC shift on even lines of the tagged video signal while a "1" bit is encoded by applying a negative DC shift on the even lines.

System 100 has been described in the context of two signals. The invention may also be used to synchronize three or more signals by encoding each signal with a correlation sequence and detecting a phase offset in each tagged signal.

In some systems, a video signal may pass through a transformation such that the clock signal generated from the derived from the resulting video signal in the clock generator 170 in the decoder may not have the same frequency as the clock signal generated by clock generator 150 in the encoder. In such an embodiment, the clock generator 170 may be configured to derive the clock signal such that the clock signals 304, 312 have the same frequency. For example, if a video signal is converted from PAL-B (50 Hz) to NTSC (59.94 Hz), the clock signal 312 will be generated differently than the generation of the clock signal 304. Another example is a conversion from film to video applications.

In some embodiments in which a video signal is transformed from one format to another, the correlation sequence may be designed such that the resulting video signal (after the transformation) is tagged with a correlation signal that is easier to analyze. For example, if a video signal will pass through a de-interlacer, the correlation sequence could be selected to apply the same bits (for example, the same 4 bits) to fields 1 and 2 of the interlaced signal. The de-interlacer will then provide a signal with the same bits (i.e. the same 4 bits) without any overlap or duplication of bits from other bit periods.

In other embodiments, the video and audio signals may be tagged with different correlation signals. Typically, the correlation signals used to tag the audio and video signals will have the same bit length. In other embodiments, the correlations signals may have different bit lengths and may be added to the audio and video signals at different frequencies such that the total length in time of the different correlation signals is approximately equal.

The present invention has been described here by way of example only. Various modification and variations may be made to these exemplary embodiments without departing from the spirit and scope of the invention, which is limited only by the appended claims.

I claim:

1. A method of synchronizing an audio signal and a video signal comprising:
   providing an input audio signal and an input video signal that have a synchronized phase relationship;
   tagging the input video signal to provide a tagged video signal;
   tagging the input audio signal to provide a tagged audio signal;
   transmitting the tagged video and audio signals through a network;

analyzing the tagged audio and video signals to determine the extent to which the tagged audio and video signals are unsynchronized; and providing a synchronization signal corresponding to the extent to which the tagged audio and video signals are unsynchronized;

wherein the input video signal is tagged by:

generating a correlation signal at a correlation signal bit frequency;

generating a video correlation waveform gain signal corresponding to the power level of the input video signal within a selected frequency range;

providing a video correlation signal based on the correlation signal and the video correlation waveform gain signal; and adding the video correlation signal to the input video signal.

2. The method of claim 1 wherein the correlation signal corresponds to a pre-determined tagging sequence.

3. The method of claim 2 wherein the pre-determined tagging sequence is a bit sequence and the bit length of the bit sequence is selected based on the maximum synchronization error to be corrected.

4. The method of claim 1 wherein the correlation signal is generated with a correlation signal bit frequency that is within the pass band of the network.

5. The method of claim 1 wherein the correlation signal bit frequency is determined based at least in part on a video signal clock that is derived from the input video signal.

6. The method of claim 1 wherein the correlation signal bit frequency is determined based at least in part on the input audio signal.

7. The method of claim 1 wherein the correlation signal bit frequency is determined based on a clock signal not provided in the input audio signals signal or the input video signal.

8. The method of claim 1 wherein the correlation signal is well-behaved.

9. The method of claim 8 wherein the correlation signal is chosen to have a relatively high auto-correlation co-efficient when cross-correlated with an unshifted version of itself and to have relative low cross-correlation coefficients when cross-correlated with shifted versions of itself.

10. The method of claim 1 wherein the video correlation signal is provided by smoothing the correlation signal to provide a video correlation waveform; and scaling the video correlation waveform in response to the video correlation waveform gain signal.

11. The method of claim 1 wherein the video correlation waveform signal corresponds to the power level of the input video signal within the pass band of video processing and transmission elements in the network.

12. The method of claim 1 wherein the input audio signal is tagged by:

generating an audio correlation waveform gain signal corresponding to the power level of the input audio signal within a selected frequency range;

providing an audio correlation signal based on the correlation signal and the audio correlation waveform gain signal; and adding the audio correlation signal to the input video signal.

13. The method of claim 12 wherein the video correlation signal is provided by smoothing the correlation signal to provide an audio correlation waveform; and scaling the audio correlation waveform in response to the audio correlation waveform gain signal.

14. The method of claim 12 wherein the video correlation waveform signal corresponds to the power level of the input audio signal within the pass band of audio processing and transmission elements in the network.

15. A method of synchronizing an audio signal and a video signal comprising:

providing an input audio signal and an input video signal that have a synchronized phase relationship;

tagging the input video signal to provide a tagged video signal;

tagging the input audio signal to provide a tagged audio signal;

transmitting the tagged video and audio signals through a network;

analyzing the tagged audio and video signals to determine the extent to which the tagged audio and video signals are unsynchronized; and providing a synchronization signal corresponding to the extent to which the tagged audio and video signals are unsynchronized;

wherein the input audio signal is tagged by:

generating a correlation signal at a correlation signal bit frequency;

generating an audio correlation waveform gain signal corresponding to the power level of the input audio signal within a selected frequency range;

providing an audio correlation signal based on the correlation signal and the audio correlation waveform gain signal; and adding the audio correlation signal to the input video signal.

16. The method of claim 15 wherein the audio correlation signal is provided by smoothing the correlation signal to provide an audio correlation waveform; and scaling the audio correlation waveform in response to the audio correlation waveform gain signal.

17. The method of claim 16 wherein the audio correlation waveform signal corresponds to the power level of the input audio signal within the pass band of audio processing and transmission elements in the network.

18. The method of any one of claim 1 wherein the audio and video signals are analyzed by:

generating a weighted tagged video signal corresponding to the tagged video signal;

sequentially comparing the weighted tagged video signal with a progressively shifted version of the correlation signal;

identifying a video offset value corresponding to a phase difference between the tagged video signal and a zero phase signal;

generating a weighted tagged audio signal corresponding to the tagged audio signal;

sequentially comparing the weighted audio video signal with a progressively shifted version of the correlation signal; and identifying an audio offset value corresponding to a phase difference between the tagged video signal and the zero phase signal.

19. The method of claim 18 wherein the video offset value is identified in part by performing a leaky integration of a series of derivative values for the result of the comparison between the weighted tagged video signal and each progressively shifted version of the correlation signal between successive zero phase signals.

20. The method of claim 18 wherein the audio offset value is identified in part by performing a leaky integration of a series of derivative values for the result of the comparison between the weighted tagged audio signal and each progressively shifted version of the correlation signal between successive zero phase signals.

21. The method 18 wherein the synchronization signal is provided based on the difference between the video offset value and audio offset value.

22. The method claim 18 wherein the weighted tagged video signal is generated by filtering the tagged video signal across frequency components generally corresponding to frequency components of the correlation signal.

23. The method claim 18 wherein the weighted tagged audio signal is generated by filtering the tagged audio signal across frequency components generally corresponding to frequency components of the correlation signal.

24. The method of claim 1 wherein the correlation sequence is selected based on a transformation of the tagged video signal between tagging of the video signal and the analysis of tagged video signal.

25. The method of any one of claim 15 wherein the audio and video signals are analyzed by:
   generating a weighted tagged video signal corresponding to the tagged video signal;
   sequentially comparing the weighted tagged video signal with a progressively shifted version of the correlation signal;
   identifying a video offset value corresponding to a phase difference between the tagged video signal and a zero phase signal;
   generating a weighted tagged audio signal corresponding to the tagged audio signal;
   sequentially comparing the weighted audio video signal with a progressively shifted version of the correlation signal; and
   identifying an audio offset value corresponding to a phase difference between the tagged video signal and the zero phase signal.

\* \* \* \* \*

UNITED STATES PATENT AND TRADEMARK OFFICE
CERTIFICATE OF CORRECTION

| | | |
|---|---|---|
| PATENT NO. | : 8,179,476 B2 | Page 1 of 1 |
| APPLICATION NO. | : 11/739082 | |
| DATED | : May 15, 2012 | |
| INVENTOR(S) | : Alan Plaunt | |

It is certified that error appears in the above-identified patent and that said Letters Patent is hereby corrected as shown below:

Column 13, Line 36, "in the audio signals signal or the input video signal." Should read --in the audio signal or the input video signal.--

Signed and Sealed this
Eighteenth Day of September, 2012

David J. Kappos
*Director of the United States Patent and Trademark Office*